US012154746B2

(12) United States Patent
Chung

(10) Patent No.: US 12,154,746 B2
(45) Date of Patent: Nov. 26, 2024

(54) ARC EXTINGUISHING ASSEMBLY AND CIRCUIT BREAKER COMPRISING SAME

(71) Applicant: LS ELECTRIC CO., LTD., Anyang-si (KR)

(72) Inventor: Han Baek Chung, Anyang-si (KR)

(73) Assignee: LS ELECTRIC CO., LTD., Anyang-si (KR)

(*) Notice: Subject to any disclaimer, the term of this patent is extended or adjusted under 35 U.S.C. 154(b) by 164 days.

(21) Appl. No.: 17/912,777

(22) PCT Filed: Mar. 3, 2021

(86) PCT No.: PCT/KR2021/002589
§ 371 (c)(1),
(2) Date: Sep. 19, 2022

(87) PCT Pub. No.: WO2021/187774
PCT Pub. Date: Sep. 23, 2021

(65) Prior Publication Data
US 2023/0317383 A1 Oct. 5, 2023

(30) Foreign Application Priority Data
Mar. 20, 2020 (KR) ........................ 10-2020-0034575

(51) Int. Cl.
*H01H 9/34* (2006.01)
*H01H 9/44* (2006.01)
(Continued)

(52) U.S. Cl.
CPC ............ *H01H 9/443* (2013.01); *H01H 9/342* (2013.01); *H01H 71/2481* (2013.01); *H01H 2071/249* (2013.01); *H01H 73/18* (2013.01)

(58) Field of Classification Search
CPC ........... H01H 9/443; H01H 9/44; H01H 9/46; H01H 9/342; H01H 71/2481;
(Continued)

(56) References Cited

U.S. PATENT DOCUMENTS 8,237,074 B2 * 8/2012 Tetik ...................... H01H 9/362 218/156
9,431,197 B2 * 8/2016 Engewald ............ H01H 33/182
(Continued)

FOREIGN PATENT DOCUMENTS

CN 110400710 A 11/2019
JP S50-109163 U 9/1975
(Continued)

OTHER PUBLICATIONS

Translation of KR20180048151 (Original document published May 10, 2018) (Year: 2018).*
(Continued)

*Primary Examiner* — William A Bolton
(74) *Attorney, Agent, or Firm* — K&L Gates LLP

(57) ABSTRACT

The present disclosure relates to an arc extinguishing assembly, including side members which are spaced apart by a certain distance and disposed to face each other; an exhaust which is installed on an upper part of the side member; a plurality of grids which are installed between the side members and having both ends fixed to each of the side members; an arc guide having one end coupled to the side member and installed under the plurality of grids; and a magnet which is installed such that both ends are respectively coupled to the side members under the plurality of grids, and forms an electromagnetic force in a direction toward the grid, and a circuit breaker including the same.

13 Claims, 10 Drawing Sheets

(51) Int. Cl.
*H01H 71/24* (2006.01)
*H01H 73/18* (2006.01)

(58) Field of Classification Search
CPC ........... H01H 71/2454; H01H 71/2463; H01H 71/2472; H01H 71/32; H01H 71/38; H01H 2071/249; H01H 73/18
USPC ............................ 218/26, 22, 23, 24, 34, 38
See application file for complete search history.

(56) References Cited

U.S. PATENT DOCUMENTS

| | | | | |
|---|---|---|---|---|
| 9,530,593 | B1 * | 12/2016 | Fasano | H01H 33/182 |
| 9,673,004 | B1 * | 6/2017 | Ruempler | H01H 9/36 |
| 9,679,720 | B1 * | 6/2017 | Bugryn | H01H 33/182 |
| 9,991,073 | B2 * | 6/2018 | Kralik | H01H 33/182 |
| 10,242,814 | B2 * | 3/2019 | Hertzog | H01H 9/362 |
| 2017/0301490 | A1 | 10/2017 | Domejean et al. | |
| 2019/0139728 | A1 * | 5/2019 | Kralik | H01H 9/446 |

FOREIGN PATENT DOCUMENTS

| | | | | |
|---|---|---|---|---|
| JP | 53128776 | A | 11/1978 | |
| JP | 55034581 | Y | 8/1980 | |
| JP | 63129932 | U | 8/1988 | |
| JP | 2012243659 | A | 12/2012 | |
| JP | 2017041445 | A | 2/2017 | |
| KR | 20180048151 | * | 5/2018 | H01H 73/18 |

OTHER PUBLICATIONS

International Search Report for related International Application No. PCT/KR2021/002589; report dated Sep. 23, 2021; (5 pages).
Written Opinion for related International Application No. PCT/KR2021/002589; report dated Sep. 23, 2021; (4 pages).
Notice of Allowance for related Japanese Application No. 2022-555983; action dated Feb. 6, 2024; (3 pages).
Extended European Search Report for related European Application No. 217721570.0; action dated Apr. 2, 2024; (11 pages).
Office Action for related Japanese Application No. 2022-555983; action dated Oct. 3, 2023; (3 pages).

* cited by examiner

ARC EXTINGUISHING ASSEMBLY AND CIRCUIT BREAKER COMPRISING SAME

CROSS-REFERENCE TO RELATED APPLICATION

The present application is a National Stage of International Application No. PCT/KR2021/002589 filed on Mar. 3, 20211, which claims priority to and the benefit of Korean Utility Model Application No. 10-2020-0034575, filed on Mar. 20, 2020, the disclosure of which is incorporated herein by reference in its entirety.

FIELD

The present disclosure relates to an arc extinguishing assembly in which a magnet is installed to effectively extinguish an arc generated by blocking an electric current, and a circuit breaker including the same, BACKGROUND A circuit breaker is a device that blocks the flow of current when abnormal current such as electrical leakage, short circuit or excessive current occurs in the circuit. Through this, it is possible to prevent an accident that may occur in a circuit or an electronic device connected to the circuit. The circuit breaker is energably installed at a specific position in the circuit such that the current of the circuit passes through the circuit breaker.

The circuit breaker is connected such that when a normal current flows, the movable contact point is in contact with the stationary contact point, and when the movable contact point and the stationary contact point are in contact with each other, the circuit can conduct electricity.

When an overcurrent or abnormal current flows through the circuit breaker, the movable contact point and the stationary contact point in contact are spaced apart from each other. In this case, the current flowing between the movable contact point and the stationary contact point is not immediately extinguished, but is changed in the form of an arc and is extended along the movable contact point.

The arc is a flow of high-temperature and high-pressure electrons, and when the generated arc stays in the circuit breaker for a long period of time, there is a risk of damage to each component of the circuit breaker. In addition, when the arc is discharged to the outside of the circuit breaker without a separate treatment process, there is a risk of injury to the user.

Accordingly, the circuit breaker is provided with an arc extinguishing assembly for discharging while extinguishing the arc. The generated arc is passed through the extinguishing device, the arc pressure is increased, the moving speed is increased, and it is cooled at the same time and can be discharged to the outside.

A conventional circuit breaker (Korean. Utility Model Application No. 20-2008-0009468) discloses the structure of an air circuit breaker, which is stacked with a certain gap in the arc chamber and includes a grid in which an induction groove is formed such that a contact point can be located, and a grid plate which is provided on the side wall of the guide groove of the grid Such a circuit breaker can induce an arc toward the grid through the guide plate, but in the case of a small current where the magnitude of the current is not large, there is a problem in that it is difficult to create a movement path of the arc along the grid because the generated pressure is not large.

Accordingly, it is necessary to research a method for effectively forming an arc path along the grid even when a small current is applied by separately generating an electromagnetic force inside the arc extinguishing assembly.

SUMMARY

An object of the present disclosure is to provide the structure of an arc extinguishing assembly in which the generated arc can be extended to a grid and a runner.

Another object of the present disclosure is to provide the structure of an arc extinguishing assembly that is capable of pushing the arc generated by the magnetic field generated by the magnet toward the runner by arranging the magnet inside such that the movement path of the arc is smoothly formed even when a small current is applied.

Still another object of the present disclosure is to provide the structure of an arc extinguishing assembly in which a magnet for forming the movement path of an arc can be stably installed, and excessive design changes are unnecessary for the installation of the magnet.

The arc extinguishing assembly which can solve the above-described problems may include side members which are spaced apart by a certain distance and disposed to face each other; an exhaust which is installed on an upper part of the side member; a plurality of grids which are installed between the side members and having both ends fixed to each of the side members; an arc guide having one side coupled to the side member and installed under the plurality of grids; and a magnet which is installed such that both ends are respectively coupled to the side members under the plurality of grids, and forms an electromagnetic force in a direction toward the grid.

According to an example of the present disclosure, the magnet may include an electromagnet having both sides fixed to a lower part of the side member, respectively, and forming a magnetic field by being magnetized by an electric current; and a permanent magnet which is installed inside the electromagnet and rotates in a direction crossing an extension direction of the electromagnet.

In this case, the electromagnet may include a core which is made of a cylindrical magnetizable material; and a coil which is formed to extend in a shape surrounding an outer surface of the core.

In addition, at both ends of the core, fixing shafts are formed to protrude so as to be supported by being fitted to an inner surface of each of the side members.

According to an example of the present disclosure, the fixing shaft may pass through the arc guide and be seated in a fixing groove formed in the side member.

According to an example of the present disclosure, the permanent magnet may be located in a permanent magnet accommodating portion consisting of a space formed inside the electromagnet.

According to an example of the present disclosure, the permanent magnet may be composed of at least one.

According to an example of the present disclosure, the magnet may be fixed to both sides of the arc guide, respectively.

According to an example of the present disclosure, the arc extinguishing assembly may further include an arc runner which is inserted between the side members, is spaced apart from one side of the plurality of grids by a certain distance, and is formed to be bent toward a lower part of the grid.

According to an example of the present disclosure, the magnet may be installed such that both ends are respectively coupled to the side member at positions that are spaced apart from the arc guide by a certain distance.

According to an example of the present disclosure, an insulating material may be included on an outer surface of the side member.

The circuit breaker according to the present disclosure which can solve the above-described problems may include a stationary contact; a movable contact that moves in a direction toward the stationary contact or a direction away from the stationary contact; and an arc extinguishing assembly which is located adjacent to the stationary contact and the movable contact so as to extinguish an arc which is generated by the stationary contact and the movable contact being spaced apart, wherein the arc extinguishing assembly may include side members which are spaced apart by a certain distance and disposed to face each other; an exhaust which is installed on an upper part of the side member; a plurality of grids which are installed between the side members and having both ends fixed to each of the side members; an arc guide having one end coupled to the side member and installed under the plurality of grids; and a magnet which is installed such that both ends are respectively coupled to the side members under the plurality of grids, and forms an electromagnetic force in a direction toward the grid.

According to an example of the present disclosure, the magnet may include an electromagnet having both sides fixed to a lower part of the side member, respectively, and forming a magnetic field by being magnetized by an electric current; and a permanent magnet which is installed inside the electromagnet and rotates in a direction crossing an extension direction of the electromagnet.

According to an example of the present disclosure, the electromagnet may include a core which is made of a cylindrical magnetizable material; and a coil which is formed to extend in a shape surrounding an outer surface of the core.

According to an example of the present disclosure, the permanent magnet may be located in a permanent magnet accommodating portion consisting of a space formed inside the electromagnet.

According to an example of the present disclosure, the permanent magnet may be composed of at least one.

By the structure of the arc extinguishing assembly as described above, the generated arc receives a force toward the arc runner by the electromagnetic force formed by the magnet, and the arc extension speed is increased in a direction toward the arc runner such that the arc extinguishing performance can be further improved.

In addition, through the structure in which an electromagnet and a permanent magnet for generating electromagnetic force are installed together in the arc extinguishing assembly, the arc extinguishing performance can be secured without significantly changing the design structure of an arc extinguishing assembly.

Further, in the arc extinguishing assembly, both sides of the electromagnet can be stably fixed between the side members, respectively, and since at least one permanent magnet is installed in the space formed inside the electromagnet, it is possible to achieve the advantages of securing a greater electromagnetic force and securing the space.

DETAILED DESCRIPTION

Hereinafter, the exemplary embodiments disclosed in the present specification will be described in more detail with reference to the attached drawings, and the same or equivalent components will be provided with the same reference numbers, and the description thereof will not be repeated. The terms "module" and "unit or portion" for components used in the following description are merely provided only for facilitation of preparing this specification, and thus, they are not granted a specific meaning or function. In describing the exemplary embodiments disclosed in the present specification, if it is determined that the detailed descriptions of related known technologies may obscure the gist of the exemplary embodiments disclosed in the present specification, the detailed descriptions thereof will be omitted. In addition, the accompanying drawings are only for easy understanding of the exemplary embodiments disclosed in the present specification, and the technical spirit disclosed herein is not limited by the accompanying drawings, and all changes included in the spirit and scope of the present disclosure should be understood to include equivalents or substitutes.

It will be understood that although the terms such as first, second and the like may be used herein to describe various elements, these elements should not be limited by these terms. These terms are generally only used to distinguish one element from another.

It will be understood that when an element is referred to as being "connected with" or "joined to" another element, it may be directly connected with or joined to the other element, but another element may exist in the middle. On the other hand, when it is mentioned that a certain element is "directly connected with" or "directly joined to" another element, it should be understood that no other element is present in the middle.

A singular representation may include a plural representation unless it represents a definitely different meaning from the context.

In the present application, terms such as "include" or "have" are intended to designate that a feature, number, step, operation, component, part or combination thereof described in the specification exists, and it should be understood that it does not preclude the possibility of addition or existence of one or more other features or numbers, steps, operations, components, parts or combinations thereof.

Figure 1:
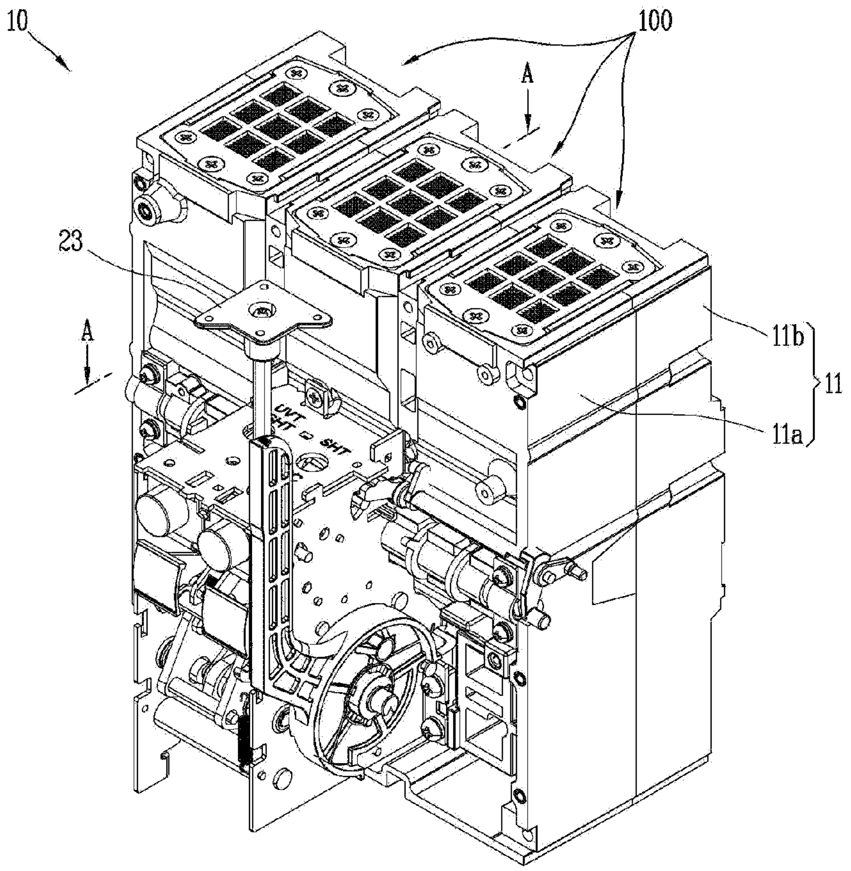
FIG. 1 is a perspective view of a circuit breaker viewed from the outside.
Figure 2:
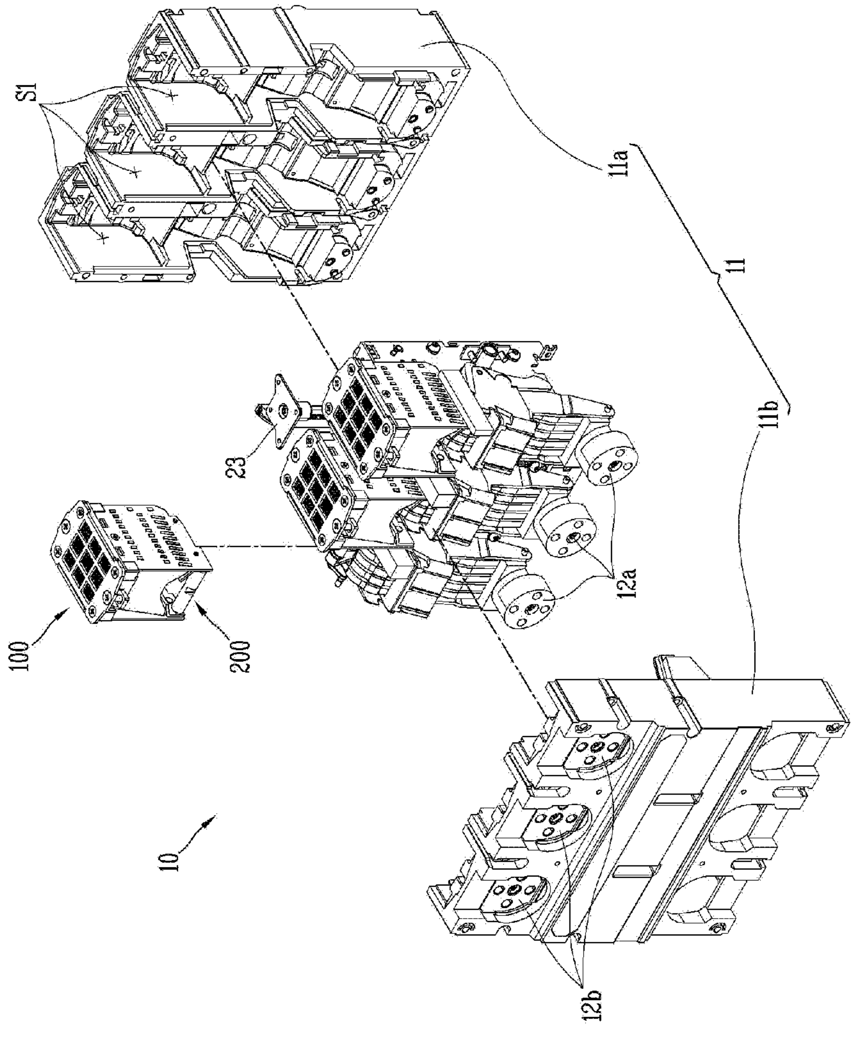
FIG. 2 is an exploded perspective view of the circuit breaker.
Figure 3:
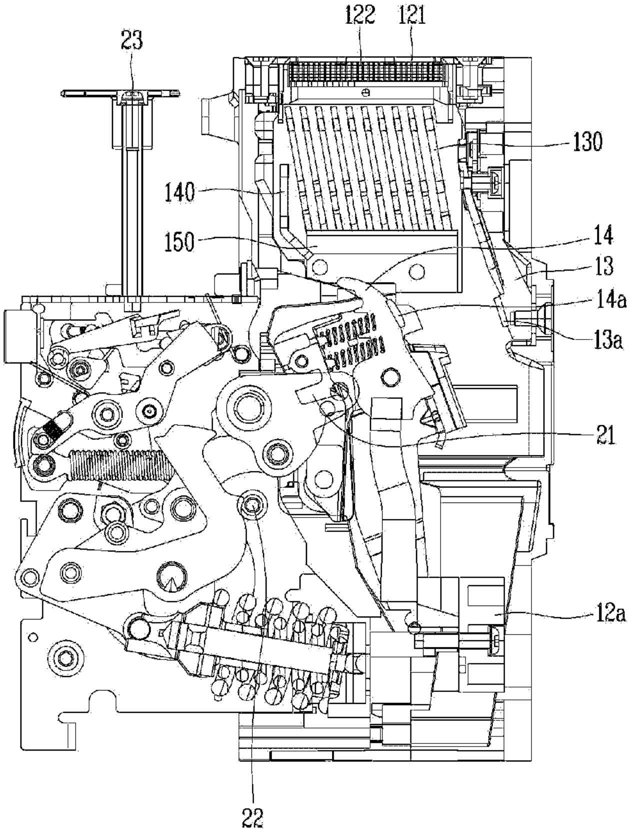
FIG. 3 is a cross-sectional view of the circuit breaker of FIG. 1 taken along line A-A'.

FIG. 1 is a perspective view showing the state of the circuit breaker 10, and FIG. 2 is an exploded perspective view of the circuit breaker 10. FIG. 3 is a cross-sectional view of the circuit breaker 10 taken along line A-A'.

The circuit breaker 10 serves to block the flow of current when an abnormal current is generated, and may refer to an air circuit breaker.

Herein, the air circuit breaker is a type of circuit breaker, meaning the current in a state where the circuit breaker performs a blocking operation, and when an abnormal current exceeding a preset current range value leaks from the circuit breaker, it is a device that blocks the flow of the current in a circuit.

The circuit breaker 10 includes a circuit breaker body 11 which forms an exterior and has an accommodation space formed therein. A plurality of arc extinguishing assemblies 100 may be installed inside the circuit breaker body 11.

The circuit breaker body 11 is coupled to a front side cover 11*b* and a rear side cover 11*a* in a direction facing each other to form an inner space.

The circuit breaker body 11 may be formed of a material having high heat resistance and high rigidity. This is to prevent damage to each component mounted therein, and to prevent damage by an arc generated inside. For example, the circuit breaker body 11 may be made of synthetic resin or reinforced plastic.

The internal space of the circuit breaker body 11 may conduct electricity with the outside, and each component mounted therein may be connected to conduct electricity with an external power source or a load.

A power supply side connection portion 12*a* connected to the power supply side so as to conduct electricity, and a load side connection portion 12*b* connected to the load side to conduct electricity with the power supply side may be respectively installed in the front part of the circuit breaker body 11.

Further, in the accommodation space formed by the coupling of a front side cover 11*b* and a rear side cover 11*a*, the stationary contact 13 and the movable contact 14 for blocking or conducting electricity with the power supply side connection portion 12*a* and the load side connection portion 12*b* may be respectively installed.

A stationary contact point 13*a* may be formed in the stationary contact 13, and a movable contact point 14*a* may be formed in the movable contact 14. Accordingly, when a normal current flows in the circuit, the stationary contact point 13*a* and the movable contact point 14*a* are in contact with each other such that a current may flow between the power supply side connection portion 12*a* and the load side connection portion 12*b*.

As shown in FIG. 3, a shooter 21 may be configured to rotate together as the movable contact 14 is rotated away from the stationary contact 13.

The shooter 21 may be installed to be connected to a crossbar 22 and a lever 23. Specifically, one end of the shooter 21 is restrained by the crossbar 22, and an elastic member is provided at the other end of the shooter 21.

In a state where the stationary contact point 13*a* and the movable contact point 14*a* are in contact with each other, the shooter 21 presses the elastic member and stores a restoring force. In this case, the external force for pressing may be provided by a state where the crossbar 22 is rotated toward the stationary contact 13.

When the movable contact point 14*a* is located to be spaced apart from the stationary contact point 13*a*, the movable contact 14 is rotated in a direction away from the stationary contact point 13. In this case, the crossbar 22 may be rotated, and specifically, one end of the shooter 21 is released such that it may be rotated by a restoring force provided by the elastic member. As the shooter 21 rotates and hits the lever 23, the lever 23 is also rotated, and a trip mechanism may be performed.

The lever 23 is partially exposed to the outside of the air circuit breaker 10, and the lever 23 may be rotated by hitting the rotated shooter 21. When the trip mechanism is performed, the lever 23 may be rotated in a preset direction, and the user may easily recognize that the trip mechanism has been performed. In addition, the user may rotate the lever 23 to adjust the air circuit breaker 10 to a state that can conduct electricity again.

That is, in the circuit breaker 10, when an abnormal current flows in the circuit, the movable contact 14 is rotated by a predetermined angle in a direction away from the stationary contact 13, and as the stationary contact point 13*a* and the movable contact point 14*a* are spaced apart from each other, the flow of current may be blocked.

In this case, when the movable contact point 14*a* and the stationary contact point 13*a* are spaced apart from each other, an arc is generated between the movable contact point 14*a* and the stationary contact point 13*a*.

The arc is a plasma of high-temperature electrons and ions, and when the generated arc stays in the internal space of the circuit breaker for a long period of time, there is a risk of damage to each component of the circuit breaker.

In addition, when the arc is discharged to the outside of the circuit breaker without a separate treatment process, there is a risk of injury to the user.

If the arc is not extinguished quickly, the components that make up the circuit breaker will be damaged. The circuit breaker 10 is provided with an extinguishing device for discharging while extinguishing the arc such that the generated arc passes through the extinguishing device, the arc pressure is increased, the moving speed is increased, and the arc is cooled at the same time and discharged to the outside.

In the circuit breaker 10 according to the present disclosure, the arc extinguishing assembly 100 for extinguishing the arc generated above the stationary contact point 13*a* and the movable contact point 14*a* may be installed.

Hereinafter, the structure of the arc extinguishing assembly 100 will be described in detail.

Figure 4:
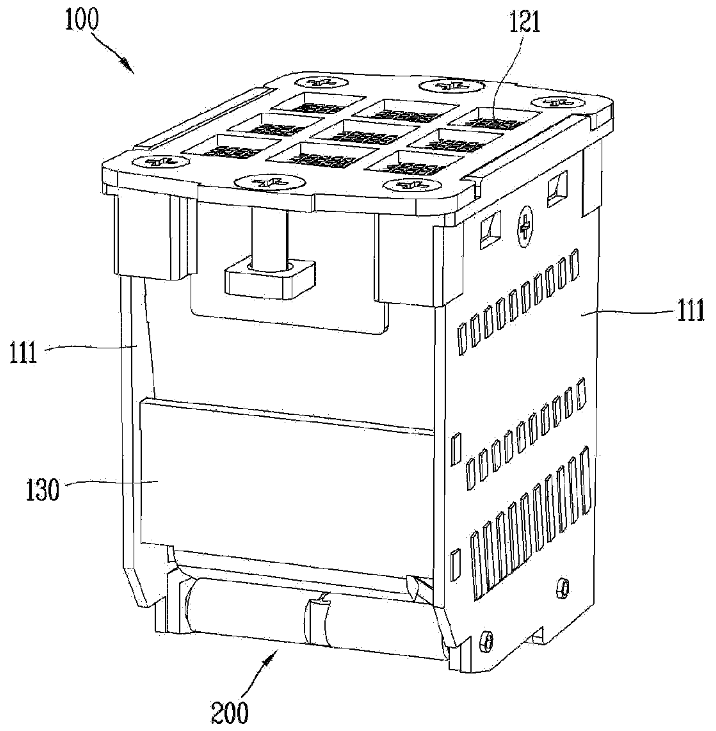
FIG. 4 is a perspective view which shows the mode of an arc extinguishing assembly.
Figure 5:
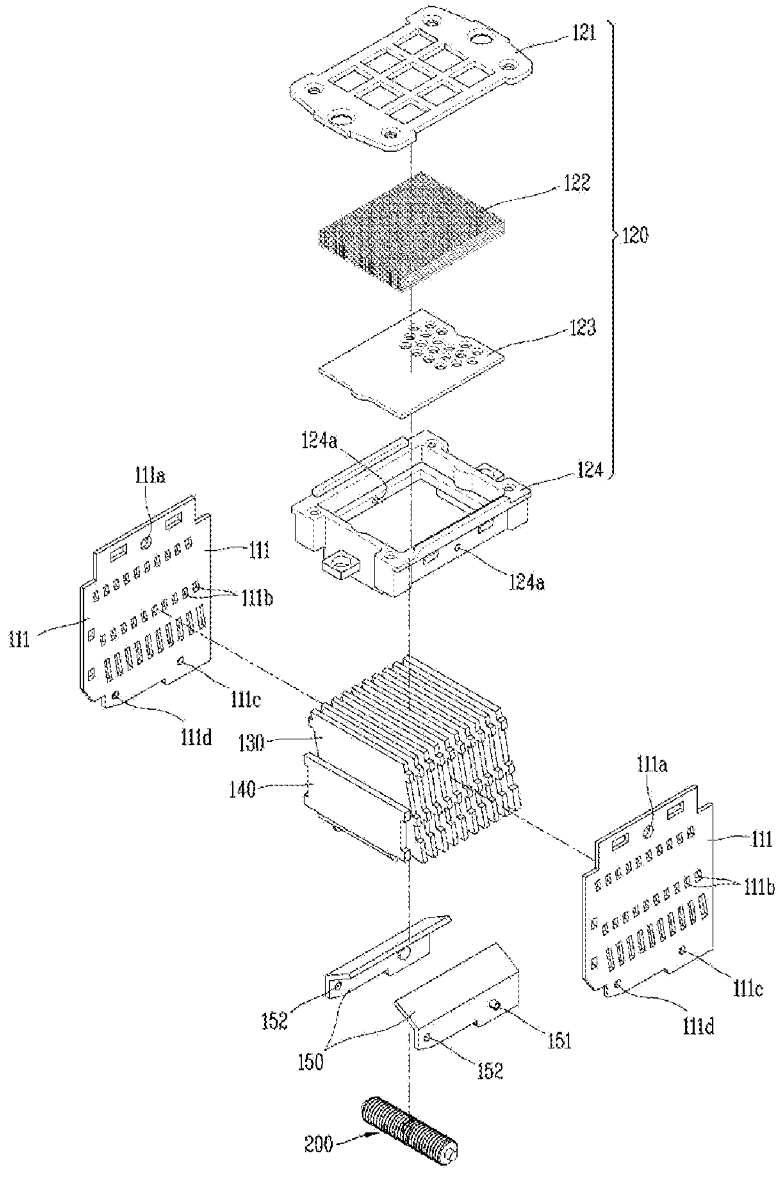
FIG. 5 is an exploded perspective view of the arc extinguishing assembly of FIG. 4.

FIG. 4 is a perspective view showing the state of an arc extinguishing assembly 100, and FIG. 5 is an exploded perspective view of the arc extinguishing assembly 100 of FIG. 4.

The arc extinguishing assembly 100 may be inserted and installed on an open side of the accommodation space formed inside the circuit breaker body 11 as described above.

The arc generated in the circuit breaker 10 is extinguished by the arc extinguishing assembly 100 and then discharged to the outside of the breaker 10 through the exhaust 120 of the arc extinguishing assembly 100. In this case, the arc is extended in the course of flowing through a grid 130 and an arc runner 140 of the arc extinguishing assembly 100.

The arc extinguishing assembly 100 includes a pair of side members 111 coupled to an exhaust 120, a grid 130, an arc runner 140 and an arc guide 150.

The exhaust 120 for discharging the extinguished arc may be formed on a plurality of grids 130. The exhaust 120 functions as a passage through which the metal gas is discharged to the outside of the circuit breaker 10.

The exhaust 120 includes an exhaust body 124, an insulating plate 123, a filter 122 and an exhaust cover 121.

A pair of side members 111 are coupled to the left and right sides of the exhaust body 124, respectively, and an accommodating portion (not assigned) in which an insulating plate 123 and a filter 122 are accommodated in the central part of the upper surface of the exhaust body 124 may be formed to be recessed, and a plurality of exhaust holes (not assigned) may be formed to pass through the insulating plate 123.

An exhaust cover 121 is coupled to an upper side surface of the exhaust body 124, and a plurality of gas outlets (not assigned) may be formed through a central part of the exhaust cover 121.

In the exhaust 120, the insulating plate 123, the filter 122 and the exhaust cover 121 are sequentially located from the lower side to the upper side. Accordingly, the metal gas introduced into the exhaust hole (not illustrated) of the insulating plate 123 may be discharged to the outside of the circuit breaker 10 through a gas outlet (not illustrated) after passing through the filter 122.

The arc extinguishing assembly 100 may be coupled to the body 11 of the circuit breaker 10 through the exhaust 120.

Fastening holes (not assigned) are respectively formed on the front side and the rear side of the exhaust cover 121, and in a state where the exhaust cover 121 covers the opening of the accommodation space (S1) of the circuit breaker 10, a fastening member (not illustrated) may be coupled to the circuit breaker body 11 through the fastening hole.

The exhaust 120 functions as a pressure raising means inside the arc extinguishing assembly 100. Specifically, the exhaust 120 covers the opening of the accommodation space (S1) such that the pressure inside the arc extinguishing assembly 100 may momentarily increase when the metal gas is generated. In this case, a temporary pressure difference is generated between the pressure inside the arc extinguishing assembly 100 and the outside of the circuit breaker 10, and the metal gas may move toward the exhaust hole of the exhaust 120.

The side members 111 are spaced apart from each other by a certain distance and may be formed in a pair of plate shapes disposed to face each other.

A grid 130 and an arc runner 140 are disposed between the side members 111.

In addition, a grid fastening hole 111*b* and an arc runner fastening hole (not illustrated) may be formed through the central part of the side member 111.

A grid fastening protrusion (not illustrated) and an arc runner fastening protrusion (not illustrated) may be respectively inserted into the grid fastening hole 111*b* and the arc runner fastening hole (not illustrated).

The grid fastening hole 111*b* and the arc runner fastening hole (not illustrated) may be formed to have sizes corresponding to the grid fastening protrusion (not illustrated) and the arc runner fastening protrusion (not illustrated) or slightly smaller sizes. Accordingly, the grid fastening protrusion and the arc runner fastening protrusion may be press-fitted into the grid fastening hole 111*b* and the arc runner fastening hole (not illustrated), respectively.

An arc guide 150 may be coupled to each side member 111, respectively. An arc guide fastening hole 111*c* for coupling with the arc guide 150 is formed to pass through the lower side of the side member 111. The arc guide fastening hole 111*c* may be formed in the shape of a cylindrical hole formed to pass through one side of the side member 111.

In addition, a fixing shaft support groove 111*d* may be formed in the side member 111 such that the fixing shaft 213 of the core 211 is located at a position spaced apart from the arc guide fastening hole 111*c* by a predetermined distance.

One side surface of the arc guide 150 is located to be in close contact with the side member 111.

In this case, an arc guide fastening portion 151 may be formed to protrude in a direction toward the side member 111 on one side surface of the arc guide 150.

In addition, a fixing shaft insertion hole 152 for fixing the core 211 to a position spaced apart from the arc guide fastening portion 151 may be formed on the one side surface.

The arc guide fastening portion 151 protruding from the arc guide 150 is coupled to the arc guide fastening hole 111*c* such that the arc guide 150 may be coupled to the side member 111.

The fixing shaft 213 of the core 211 is inserted into the fixing shaft insertion hole 152 formed in the arc guide 150, and the fixing shaft 213 will be located in the fixing shaft support groove 111*d*.

A screw fastening hole 111*a* for coupling with the exhaust 120 is formed on the upper side of the side member 111 such that the pair of side members 111 may be coupled to the exhaust 120, respectively. A screw coupling groove (not illustrated) for coupling with the side member 111 may be formed in the exhaust body 124.

In a state where the side member 111 is coupled to the exhaust body 124, a fastening screw (not illustrated) passes through the screw fastening hole 111*a* and is coupled to the screw fastening groove 124*a*.

The grids 130 are formed in a plate shape and spaced apart from each other by a predetermined distance in one direction away from the stationary contact point 13*a*, and has a structure in which a plurality of grids are stacked.

Grid fastening protrusions (not illustrated) are formed to protrude from both sides of the grid 130 and are located to be inserted into the grid fastening holes 111*b*. The grid 130 may be fixed between the pair of side members 111.

The grid 130 may be made of any material capable of applying electromagnetic attraction to the arc, and for example, it may be made of iron (Fe).

As the arc is extended and moved between the plurality of grids 130, the arc voltage is increased and the arc may be cooled.

The arc runner 140 is formed in a plate shape, and may be spaced apart from the plurality of grids 130 by a predetermined distance in the rear side.

The generated arc extends to the lower end of the arc runner 140 and flows along the arc runner 140. If the arc does not reach the arc runner 140, the arc extinguishing performance may be reduced, and the lower end of the arc runner 140 may be formed in a curved shape toward the stationary contact point 13*a*.

The lower end of the curved arc runner 140 is located below the grid 130 which is located on the rear side among the plurality of grids 130. Due to the curved structure of the arc runner 140, the distance between the lower end of the arc runner 140 and the stationary contact point 13*a* may be shortened.

The arc runner 140 may be formed of any material capable of applying electromagnetic attraction to the arc, and for example, the arc runner may be formed of an iron (Fe) material.

The arc guide 150 is provided as a pair and may be respectively coupled to the pair of side members 111 at the lower side of the grid 130.

The arc guide 150 may be formed of an insulating material and may be formed to extend along the stacking direction of the grid 130. That is, the arc guide 150 may be formed to extend in a direction away from the stationary contact point 13*a*.

The arc guide 150 may have a shape extending from the lower side of the grid 130 to the rear side.

The arc guide 150 may be made of a pair of members installed to face each other, and may be made to reduce the size of a space formed between each member. Accordingly, it will be possible to reduce the dispersion of the metal gas generated at the stationary contact point when an abnormal current is generated.

In addition, each member (not illustrated) constituting the arc guide 150 is made such that the distance therebetween increases from the front side to the rear side, and thus, the size of the space between the pair of members will be able to increase from the front side to the rear side.

In this case, since a pressure difference between the front side and the rear side occurs when the metal gas is generated at the stationary contact point, the metal gas is pushed toward the rear side by the pressure difference. As a result, it will be possible to increase the extending length and extending speed of the arc from the front side to the rear side.

In addition, the arc extinguishing assembly 100 may include a magnet 200.

The magnet 200 is located below the side member 111 and may be disposed between each arc guide 150 disposed to face each other.

When a small current is applied to the circuit breaker 10, it becomes difficult to smoothly guide the art to the arc extinguishing assembly only by the pressure of the arc that is generated by performing the trip mechanism as the stationary contact point 13*a* and the movable contact point 14*a* are rotated as they are spaced apart from each other. Accordingly, the magnet 200 is installed in the arc extinguishing assembly 100 and serves to induce the movement of the generated arc.

Hereinafter, the structure of the arc extinguishing assembly 100 to which the magnet 200 is applied will be described in detail.

Figure 6:
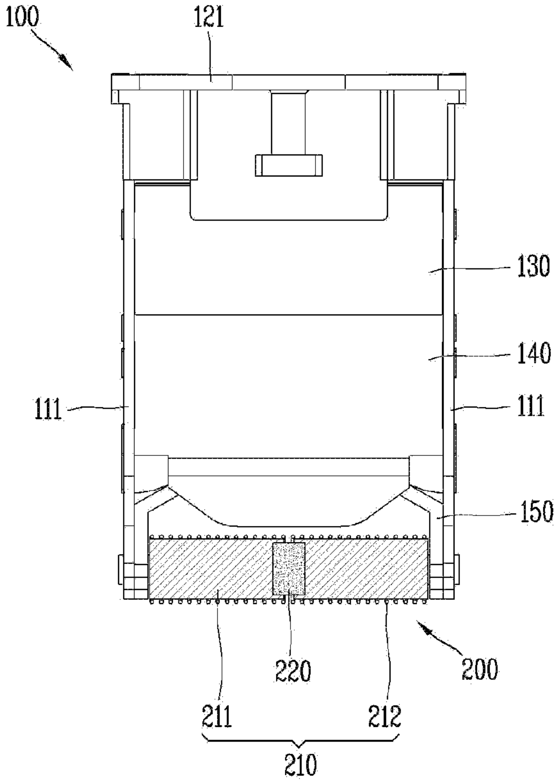
FIG. 6 is a longitudinal sectional view of the arc extinguishing assembly.
Figure 7:
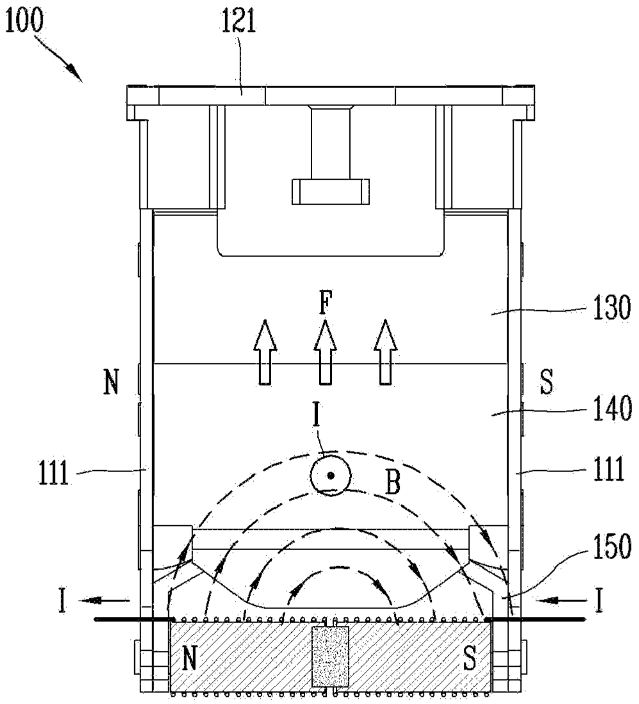
FIG. 7 is a conceptual diagram showing a state where a magnetic field is formed by a magnet.

FIG. 6 is a longitudinal cross-sectional view of the arc extinguishing assembly 100, and FIG. 7 is a conceptual diagram illustrating a state where a magnetic field is formed by the magnet 200.

Figure 8A:
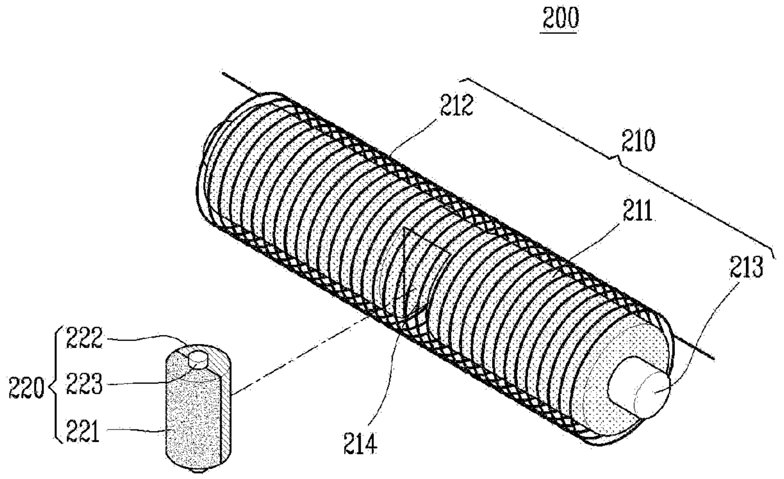
FIG. 8*a* is a conceptual diagram showing a state where a permanent magnet is installed in an electromagnet.
Figure 8B:
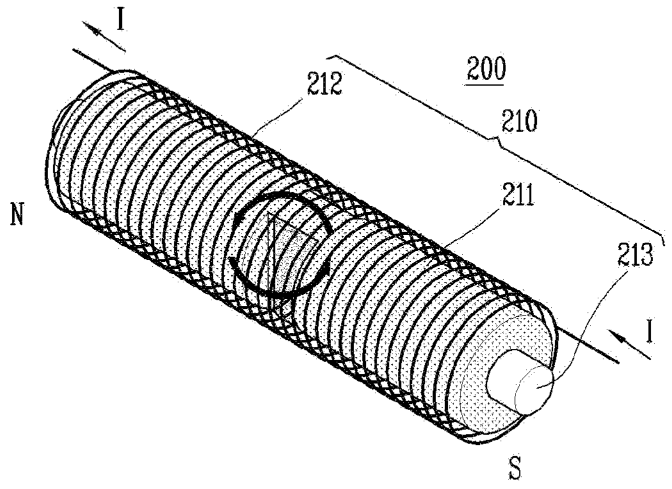
FIG. 8*b* is a conceptual diagram showing a state when a current is applied to a magnet.

In addition, FIG. 8*a* is a perspective view showing a state where the permanent magnet 220 is coupled to the electromagnet 210, and FIG. 8*b* is a conceptual diagram showing a state when a current flows in the magnet 200.

As described above, when the movable contact point 14*a* and the stationary contact point 13*a* are spaced apart from the lower side of the arc extinguishing assembly 100, an arc is generated. The arc may extend along the movable contact point 14*a*.

Metal gas is generated between the movable contact point 14*a* and the stationary contact point 13*a*, and the pressure of the part of the stationary contact point 13*a* is momentarily increased, and the arc is extended toward the grid 130 and the arc runner 140 by the pressure difference.

The extended arc reaches the plurality of grids 130 and the arc runner 140, and the arc is extended upward and cooled while flowing along the grid 130 and the arc runner 140.

However, when it is necessary to cut off a small current, there is a concern that the force to push the arc generated when the movable contact point 14*a* falls from the stationary contact point 13*a* toward the grid 130 and the arc runner 140 may be insufficient, and there may be a problem in that the arc extinguishing is not sufficiently performed, which may cause damage to other components of the circuit breaker.

In order to solve this problem, the arc extinguishing assembly 100 may include a magnet 200 installed on the lower side of the side member 111.

As shown in FIG. 6, the magnet 200 is installed at a position adjacent to the arc guide 150, and the magnet 200 serves to form a magnetic field in a direction toward the grid 130.

The magnet 200 may move the generated arc toward the grid 130 and the arc runner 140.

The magnet 200 may include an electromagnet 210 and a permanent magnet 220.

The electromagnet 210 may include a core 211 made of a cylindrical ferromagnetic material and a coil 212 installed to surround the outer surface of the core 211.

The core 211 may be made of a cylindrical magnetizable material extending in one direction, and the core 211 may be magnetized by a current flowing through the coil 212 to form a magnetic field.

In this case, the core 211 may form a different direction of the electromagnetic force generated according to the direction of the current flowing through the coil 212. For example, when the core 211 is viewed from the right side of FIG. 8*a*, the current may flow in the core 211 in a clockwise or counterclockwise direction. In this case, when the current moves in a clockwise direction along the coil 212 installed to surround the core 211, the left part of the electromagnet 210 may be magnetized to the N pole and the right part thereof may be magnetized to the S pole.

Similarly, when the current moving along the coil 212 moves in a counterclockwise direction, the right side of the electromagnet 210 in the drawing may be magnetized to the N pole, and the left side thereof may be magnetized to the S pole.

Through this, even if the direction of movement of the current is changed according to the forward or reverse connection of the circuit breaker, the magnetic field formed by the electromagnet 210 acts on the arc, and the arc may be applied in a direction toward the top of the arc extinguishing assembly 100 force. Accordingly, the arc will be able to be extinguished more smoothly on the grid 130.

At both ends of the core 211, fixing shafts 213 may be formed to protrude to be inserted into and supported by the inner surface of the side member 111, respectively. Each fixing shaft 213 may be fixedly seated on the inner surface of the side member 111.

Specifically, the fixing shaft 213 may be located to pass through the fixing shaft insertion hole 152 formed in the arc guide 150 to be seated in the fixing shaft support groove 111*d* formed in the side member 111.

In addition, as another exemplary embodiment, although not illustrated in the drawings, the core 211 may be installed in a position adjacent to the arc guide 150 and spaced apart by a predetermined distance.

In this case, the fixing shaft 213 formed in the core 211 may be directly coupled to the fixing shaft support groove 111*d* formed in the side member 111 at a position spaced apart from the arc guide 150 by a certain distance. That is, the core 211 may be directly fixedly installed on the side member 111 without contacting the arc guide 150.

In this case, an arc guide fastening portion 151 may be formed to protrude in a direction toward the side member 111 on one side surface of the arc guide 150. The arc guide fastening portion 151 may be formed in plurality, and in this case, a plurality of arc guide fastening holes 111*c* may be formed in the side member 111 to correspond to each arc guide fastening portion 151.

As shown in FIG. 7, when a current (I) is applied along the coil 212, the core 211 of the electromagnet 210 is magnetized to the S pole on the right side of the drawing and the N pole on the left side thereof to form a magnetic field. When the core 211 of the electromagnet 210 is magnetized while the current (I) moves along the coil 212, the side member 111 in contact therewith may also be magnetized, thereby increasing the strength of the magnetic field.

The side member 111 may be made of a ferromagnetic material such as iron (Fe) as a metal. When the side member 111 is made of a ferromagnetic material, the side member 111 may be magnetized by the magnet 200, thereby forming a larger magnetic field together with the magnet 200.

If the insulating material is not formed on the outer surface of the side member 111, the arc moving along the grid 130 will move through the side member 111.

Accordingly, an insulating material (not illustrated) may be applied to the outer surfaces of the side members 111 located on both sides of the plurality of grids 130. The insulating material may form a certain layer by covering or applying the outer exposed surface of the side member 111.

Herein, the insulating material refers to a non-metallic material, and may mean any one of a polyresin such as plastic, rubber and a non-metallic material.

In this case, when the current flowing direction acting on the circuit breaker is from the ground, the resultant force of a force (F) applied to the arc is formed in the upward direction, and thus, the force will be applied in the upward direction of the arc extinguishing assembly 100 for the arc generated by the circuit breaker 10. Accordingly, the arc will be able to be extinguished more smoothly by moving on the grid 130.

As another example, when the current flowing direction acting on the circuit breaker is from the ground, the direction of the current flowing in the coil 212 surrounding the core 211 of the electromagnet 210 is in the opposite direction to that described above, and thus, it will be possible to apply a force in a direction toward the top of the arc extinguishing assembly 100 for the arc generated in the circuit breaker 10.

The magnet 200 may include a permanent magnet 220 capable of forming an electromagnetic force in the same direction as the electromagnetic force formed by the electromagnet 210.

The permanent magnet 220 may have a cylindrical shape, and may include a first pole 221, a second pole 222 and a rotation shaft 223 which is located on the core 211 of the electromagnet to rotate.

The permanent magnet 220, the first pole 221 and the second pole 222 may be made of an S pole or an N pole having different polarities, which functions to increase the magnitude of the magnetic field according to the magnetization of the electromagnet 210.

The permanent magnet 220 may be installed inside the electromagnet 210. The electromagnet 210 may have a permanent magnet accommodating portion 214 formed of a predetermined space such that the permanent magnet may be accommodated. The permanent magnet 220 may rotate in a direction intersecting the extending direction of the electromagnet 210 in a state where it is located in the permanent magnet accommodating portion 214.

Accordingly, when a current flows in the coil 212 of the electromagnet 210 and the core 211 is magnetized, the permanent magnet 220 may rotate based on the rotation shaft 223, and the size of the magnetic flux formed in the electromagnet 210 may be augmented.

That is, when an abnormal current is sensed and the movable contact point 14*a* is spaced apart from the stationary contact point 13*a*, a metal gas is instantaneously generated, and an arc flows through the generated metal gas.

When the metal gas is generated, the pressure of the part where the metal gas is generated is momentarily increased, and as a result, the metal gas is raised toward the exhaust 120 of the arc extinguishing assembly 100 by the pressure difference. As a result, the arc flowing through the metal gas is raised and extended in an arcuate shape.

The generated arc passes through the space between the arc guides 150 and moves to the grid 130 and the arc runner 140, and undergoes the extinguishing process in the grid 130 and the arc runner 140 so as to be discharged to the outside of the circuit breaker 10.

The generated arc is a flow of high-temperature and high-pressure electrons and is preferably discharged to the outside of the circuit breaker 10 within a short period of time. To this end, it is preferable that the generated arc is rapidly extended from the stationary contact point 13*a* to the farthest arc runner 140 and then rapidly extended toward the exhaust 120.

However, when the magnitude of the current applied to the circuit breaker is small, the instantaneous pressure increase generated when the stationary contact point 13*a* and the movable contact point 14*a* are spaced apart is relatively low, and thus, there may be a problem in that the arc does not reach the arc runner 140, and the arc extinguishing performance is deteriorated.

Accordingly, in the arc extinguishing assembly 100 according to the present disclosure, the electromagnet 210 and the electromagnet 210 are installed at a position adjacent to the arc guide 150 between the side members 111 located to face each other. By the permanent magnet 220 installed in the arc, it is possible to smoothly extend to the arc runner 140.

Figure 9:
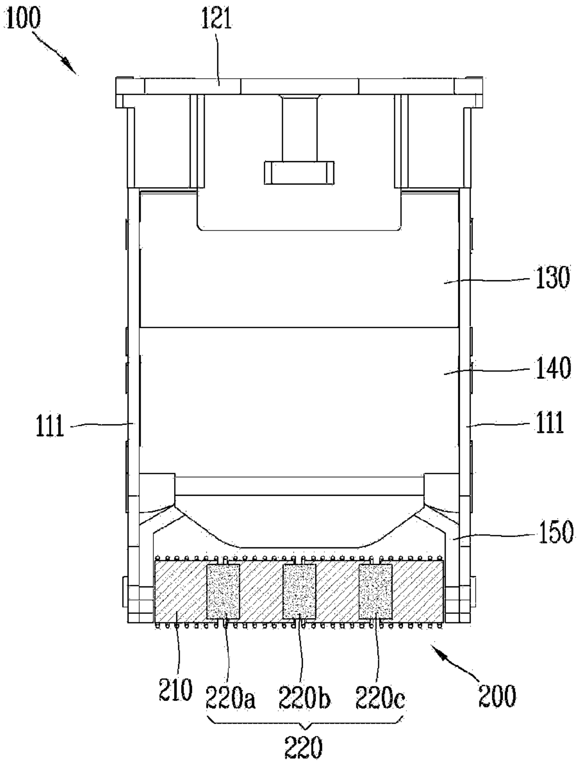
FIG. 9 is a conceptual diagram showing a state of an arc extinguishing assembly in which a plurality of permanent magnets are installed.

FIG. 9 shows a state of the arc extinguishing assembly 100 according to another exemplary embodiment of the present disclosure.

The arc extinguishing assembly 100 according to the present exemplary embodiment has the same structure as the arc extinguishing assembly 100 described above, except for the magnet 200 having a modified structure.

Accordingly, hereinafter, the modified structure of the magnet 200 will be described in detail, and the description of the remaining components will be omitted within the overlapping range.

As shown in FIG. 9, a plurality of permanent magnets 220*a*, 220*b*, 220*c* may be installed in the electromagnet 210 of the magnet 200.

In this case, a plurality of permanent magnet accommodating portions 214 are formed in the core 211 constituting the electromagnet 210 to accommodate each of the permanent magnets 220*a*, 220*b*, 220*c*.

A plurality of permanent magnets 220*a*, 220*b*, 220*c* may mean two or more permanent magnets, and for example, as shown in FIG. 9, it will be possible to consist of three permanent magnets. However, this is only one example, and the number of permanent magnets may be selected by the user in consideration of the width and length of the core.

Since the upward force acting on the arc increases by the electromagnetic force formed by the plurality of permanent magnets 220*a*, 220*b*, 220*c*, the arc is extended more rapidly on the grid 130 and the arc runner 140, and as a result, the arc extinguishing performance may be improved.

In particular, when the user uses a small current whose magnitude of current is not large, the momentary pressure increase generated according to the separation between the stationary contact point 13*a* and the movable contact point 14*a* is relatively small, and thus, the arc does not reach the arc runner 140, and the arc extinguishing performance may be deteriorated.

Accordingly, by installing a plurality of permanent magnets 220*a*, 220*b*, 220*c* inside the electromagnet 210 of the magnet 200, the electromagnetic force is applied to the arc together with the electromagnet 210 such that it is more smoothly extended to the arc runner 140.

The arc extinguishing assembly described above and the circuit breaker including the same are not limited to the configuration and method of the above-described exemplary embodiments, but the exemplary embodiments may be configured by selectively combining all or part of each exemplary embodiment such that various modifications may be made.

The present disclosure has industrial applicability, because it is possible to provide an arc extinguishing assembly in which a magnet is installed to effectively extinguish an arc generated by blocking an electric current, and a circuit breaker including the same.

The invention claimed is:

1. An arc extinguishing assembly, comprising:

side members which are spaced apart by a certain distance and disposed to face each other;

an exhaust which is installed on an upper part of the side members;

a plurality of grids which are installed between the side members and having both ends fixed to each of the side members;

an arc guide formed of an insulating material having one side coupled to the side members and installed under the plurality of grids; and a magnet which is installed such that both ends are respectively coupled to the side members under the plurality of grids, and forms an electromagnetic force in a direction toward the grid, wherein the magnet comprises:

an electromagnet having both sides fixed to a lower part of the side members, respectively, and forming a magnetic field by being magnetized by an electric current; and a permanent magnet which is installed inside the electromagnet and rotates in a direction crossing an extension direction of the electromagnet, and wherein the magnet is fixed to both sides of the arc guide.

2. The arc extinguishing assembly of claim 1, wherein the electromagnet comprises:

a core which is made of a cylindrical magnetizable material; and a coil which is formed to extend in a shape surrounding an outer surface of the core.

3. The arc extinguishing assembly of claim 2, wherein at both ends of the core, fixing shafts are formed to protrude so as to be supported by being fitted to an inner surface of each of the side members.

4. The arc extinguishing assembly of claim 3, wherein the fixing shafts pass through the arc guide and are seated in respective fixing grooves formed in the side members.

5. The arc extinguishing assembly of claim 1, wherein the permanent magnet is located in a permanent magnet accommodating portion consisting of a space formed inside the electromagnet.

6. The arc extinguishing assembly of claim 5, wherein at least two permanent magnets are provided.

7. The arc extinguishing assembly of claim 1, further comprising:

an arc runner which is inserted between the side members, is spaced apart from one side of the plurality of grids by a certain distance, and is formed to be bent toward a lower part of the grid.

8. The arc extinguishing assembly of claim 1, wherein the magnet is installed such that both ends are respectively coupled to the side members at positions that are spaced apart from the arc guide by a certain distance.

9. The arc extinguishing assembly of claim 1, wherein an insulating material is included on an outer surface of the side members.

10. A circuit breaker, comprising:

a stationary contact;

a movable contact that moves in a direction toward the stationary contact or a direction away from the stationary contact; and an arc extinguishing assembly which is located adjacent to the stationary contact and the movable contact so as to extinguish an arc which is generated by the stationary contact and the movable contact being spaced apart, wherein the arc extinguishing assembly comprises:

side members which are spaced apart by a certain distance and disposed to face each other;

an exhaust which is installed on an upper part of the side members;

a plurality of grids which are installed between the side members and having both ends fixed to each of the side members;

an arc guide formed of an insulating material having one end coupled to the side member and installed under the plurality of grids; and a magnet which is installed such that both ends are respectively coupled to the side members under the plurality of grids, and forms an electromagnetic force in a direction toward the grid, and wherein the magnet comprises:

an electromagnet having both sides fixed to a lower part of the side members, respectively, and forming a magnetic field by being magnetized by an electric current; and a permanent magnet which is installed inside the electromagnet and rotates in a direction crossing an extension direction of the electromagnet, and wherein the magnet is fixed to both sides of the arc guide.

11. The circuit breaker of claim 10, wherein the electromagnet comprises:

a core which is made of a cylindrical magnetizable material; and a coil which is formed to extend in a shape surrounding an outer surface of the core.

12. The circuit breaker of claim 10, wherein the permanent magnet is located in a permanent magnet accommodating portion consisting of a space formed inside the electromagnet.

13. The circuit breaker of claim 12, wherein at least two permanent magnets are provided.

* * * * *